US010045383B2

(12) United States Patent
Lee et al.

(10) Patent No.: US 10,045,383 B2
(45) Date of Patent: *Aug. 7, 2018

(54) METHOD AND APPARATUS FOR SEPARATED CONNECTIONS OF UPLINK AND DOWNLINK

(71) Applicant: INTELLECTUAL DISCOVERY CO., LTD, Seoul (KR)

(72) Inventors: Hyung Yeol Lee, Seoul (KR); Kwang Soon Kim, Seoul (KR)

(73) Assignee: INTELLECTUAL DISCOVERY CO., LTD, Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/606,985

(22) Filed: May 26, 2017

(65) Prior Publication Data

US 2017/0265235 A1 Sep. 14, 2017

Related U.S. Application Data

(63) Continuation of application No. 15/173,635, filed on Jun. 4, 2016, now Pat. No. 9,681,474, which is a continuation of application No. 14/229,300, filed on Mar. 28, 2014, now Pat. No. 9,392,633.

(30) Foreign Application Priority Data

Mar. 28, 2013 (KR) .......................... 10-2013-0033568

(51) Int. Cl.
*H04L 5/00* (2006.01)
*H04W 24/10* (2009.01)
*H04W 72/04* (2009.01)
*H04W 76/02* (2009.01)
*H04W 76/15* (2018.01)
*H04W 76/11* (2018.01)

(52) U.S. Cl.
CPC ......... *H04W 76/021* (2013.01); *H04L 5/0048* (2013.01); *H04W 24/10* (2013.01); *H04W 72/0413* (2013.01); *H04W 76/11* (2018.02); *H04W 76/15* (2018.02)

(58) Field of Classification Search
CPC ................ H04L 5/0048; H04W 24/10; H04W 72/0413; H04W 76/021; H04W 76/025
See application file for complete search history.

(56) References Cited

U.S. PATENT DOCUMENTS

| | | | | |
|---|---|---|---|---|
| 9,392,633 B2* | 7/2016 | Lee | ...................... | H04W 76/025 |
| 9,681,474 B2* | 6/2017 | Lee | ...................... | H04W 76/021 |
| 2010/0323749 A1 | 12/2010 | Lee et al. | | |
| 2011/0183705 A1* | 7/2011 | Tanno | .................... | H04W 36/18 |
| | | | | 455/524 |

(Continued)

*Primary Examiner* — Kashif Siddiqui
(74) *Attorney, Agent, or Firm* — Rabin & Berdo, P.C.

(57) ABSTRACT

Provided is a method and an apparatus for uplink and downlink separated connections, wherein a terminal may establish a downlink cell association with a downlink base station, receive an identifier of an uplink base station providing an uplink from the downlink base station to the terminal through an established downlink, and establish an uplink cell association with the uplink base station using the identifier of the uplink base station, and the downlink base station may select the uplink base station from among base stations in a network based on an uplink reference signal and a bias factor.

8 Claims, 7 Drawing Sheets

(56) References Cited

U.S. PATENT DOCUMENTS

2013/0331115 A1\* 12/2013 Falconetti ............. H04L 5/0053
  455/452.2
2014/0295834 A1\* 10/2014 Lee .................... H04W 76/025
  455/434

\* cited by examiner

METHOD AND APPARATUS FOR SEPARATED CONNECTIONS OF UPLINK AND DOWNLINK

CROSS-REFERENCE TO RELATED APPLICATION

This is a continuation of co-pending U.S. application Ser. No. 15/173,635, filed on Jun. 4, 2016, and allowed on Feb. 14, 2017, which is a continuation of U.S. application Ser. No. 14/229,300, filed on Mar. 28, 2014 (now U.S. Pat. No. 9,392,633, issued on Jul. 12, 2016). These applications claim the priority benefit of Korean Patent Application No. 10-2013-0033568, filed on Mar. 28, 2013, in the Korean Intellectual Property Office. The disclosures of all these applications are incorporated herein by reference.

BACKGROUND

1. Field of the Invention

The present invention relates to a method and an apparatus for terminal connections, and more particularly, to a method and an apparatus for separated uplink and downlink terminal connections.

2. Description of the Related Art

In a heterogeneous cellular network, a difference in transmission power and antenna gain may occur among base stations. In a case of connecting to a base station based on the transmission power of one of a downlink and an uplink, a loss in a signal to interference noise ratio (SINR) may be incurred on the other due to the difference. Thus, an issue of SINR unfairness may arise in the downlink and the uplink.

In general, a transmission power of a macrocell base station may be relatively greater than a transmission power of a femtocell base station. Thus, in the heterogeneous cellular network, a difference in coverage areas of the base stations may occur due to the difference in the transmission power and the antenna gain among the base stations.

Coverage of the macrocell base station having a relatively greater transmission power may be larger than a coverage area of the femtocell base station. Accordingly, a greater number of terminals may connect to the macrocell base station, and a load balancing issue in terms of a disproportionate number of terminals being connected to each of the base stations may arise. To solve such an issue, a method of determining a new terminal connection may be required.

Coverage of a cell association based on a downlink signal may differ from coverage of a cell association based on an uplink. Thus, an optimal cell association based on the downlink may differ from an optimal cell association based on the uplink.

When a terminal performs a cell association with a single base station, the terminal may generally perform the cell association with the base station based on the downlink signal. Accordingly, the terminal may not perform a cell association with an optimal base station in terms of the uplink and thus, the loss in the SINR may occur and the issue of unfairness between an SINR of the downlink and an SINR of the uplink may arise.

Moreover, a protocol for the cell association based on the uplink may not be found in conventional standards and technologies. Therefore, a method of and a protocol for determining a separate cell association in relation to the uplink may be needed.

SUMMARY

An aspect of the present invention provides a method and an apparatus that may perform separate connections with respect to a downlink and an uplink.

Another aspect of the present invention provides a method and an apparatus that may determine an uplink base station based on a strength of a received signal and a bias factor.

According to an aspect of the present invention, there is provided an operating method of a terminal performed by the terminal including establishing a downlink cell association with a first base station, receiving an identifier of a second base station providing an uplink from the first base station to the terminal through a downlink, and establishing an uplink cell association with the second base station based on the identifier of the second base station.

The operating method of the terminal may further include transmitting an uplink reference signal to base stations.

The second base station may be selected from among the base stations by the first base station.

The first base station may determine the second base station based on a strength of the uplink reference signal and a bias factor transmitted from each base station.

The uplink reference signal may include an identifier of the first base station and an identifier of the terminal.

The operating method of the terminal may further include receiving a downlink reference signal from each base station, measuring a strength of the downlink reference signal, and selecting the first base signal from among the base stations based on the measured strength.

The operating method of the terminal may further include communicating using the uplink and the downlink.

The terminal may receive downlink control information for the downlink through a downlink control channel of the first base station and receive uplink control information for the uplink through a downlink control channel of the second base station.

According to another aspect of the present invention, there is provided an operating method of a base station performed by the base station including establishing a downlink cell association with a terminal, receiving a strength of an uplink reference signal from each base station, determining an uplink base station providing an uplink to the terminal based on the strength of the uplink reference signal, and transmitting an identifier of the determined uplink base station to the terminal.

The determining may be performed based on the uplink reference signal and a bias factor transmitted from each base station.

The bias factor may be determined based on at least one of an average transmission rate of each base station and an average transmission rate of the terminal.

The strength of the uplink reference signal may be transmitted to the base station through a backhaul network between the base station and each base station.

According to still another aspect of the present invention, there is provided a terminal including a processing unit and a networking unit. The processing unit may establish a downlink cell association with a first base station through the networking unit. The networking unit may receive an identifier of a second base station providing an uplink from the first base station to the terminal through a downlink, and the processing unit may establish an uplink cell association with the second base station based on the identifier of the second base station through the networking unit.

The networking unit may transmit an uplink reference signal to base stations.

The second base station may be selected from among the base stations by the first base station.

The first base station may determine the second base station based on a strength of the uplink reference signal and a bias factor transmitted from each base station.

The networking unit may receive a downlink reference signal from each base station.

The processing unit may measure a strength of the downlink reference signal and select the first base station from among the base stations based on the measured strength.

The processing unit may communicate using the uplink and the downlink through the networking unit.

The terminal may receive downlink control information for the downlink through a downlink control channel of the first base station and receive uplink control information for the uplink through a downlink control channel of the second base station.

According to yet another aspect of the present invention, there is provided a base station including a processing unit and a networking unit. The processing unit may establish a downlink cell association with a terminal through the networking unit. The networking unit may receive a strength of an uplink reference signal from each base station, and the processing unit may determine an uplink base station providing an uplink to the terminal based on the strength of the uplink reference signal. The networking unit may transmit an identifier of the determined uplink base station to the terminal.

The processing unit may determine the uplink base station based on the strength of the uplink reference signal and a bias factor transmitted from each base station.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION

Figure 1:
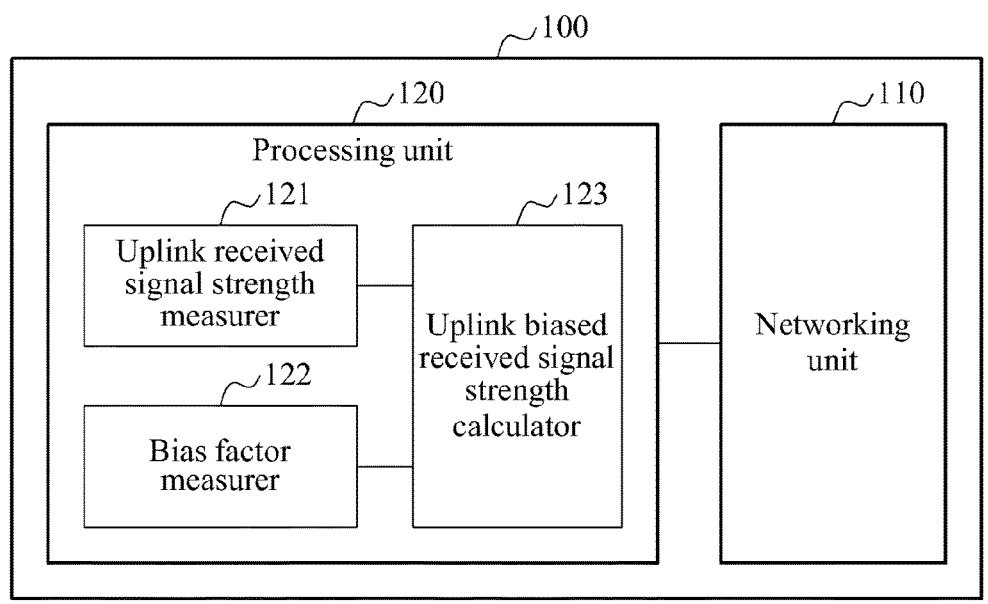
FIG. 1 is a diagram illustrating a configuration of a base station according to an embodiment of the present invention.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the accompanying drawings, however, the present invention is not limited thereto or restricted thereby.

When it is determined a detailed description related to a related known function or configuration that may make the purpose of the present invention unnecessarily ambiguous in describing the present invention, the detailed description will be omitted here. Also, terms used herein are defined to appropriately describe the exemplary embodiments of the present invention and thus may be changed depending on a user, the intent of an operator, or a custom. Accordingly, the terms must be defined based on the following overall description of this specification.

A cell association may indicate that a terminal connects to a base station. For example, the terminal generating, performing, or establishing the cell association with the base station may indicate the terminal connecting to the base station or the terminal generating or establishing a link with the base station.

A downlink may refer to a link through which data or information is transmitted from the base station to the terminal. An uplink may refer to a link through which data or information is transmitted from the terminal to the base station.

A protocol in which an uplink connection and a downlink connection are separately performed will be provided hereinafter. For the separate connections, the terminal may prepare a list of base stations available for the uplink connection using a strength of a received signal transmitted from each base station through the downlink. The terminal may transmit an uplink reference signal to each base station on the list. Each base station receiving the uplink reference signal may send information on a measured strength of the uplink received signal to a downlink base station of the terminal. Here, the downlink base station may refer to a base station with which a downlink is established with the terminal. A conventional method may be used to establish the downlink. The downlink base station may obtain and collect information transmitted from each base station and may transmit the collected information to the terminal. Thus, the terminal may receive feedback on the strength of the uplink received signal from each base station. The terminal may use the received feedback for the uplink association. Also, each base station receiving the uplink reference signal may transmit a strength of a biased received signal which is the strength of the uplink received signal to which a bias factor.

Each base station may calculate the strength of the biased received signal by applying a separate bias factor suitable for a cell type and a cell situation of the base station to the uplink received signal. The cell type may be a macro cell or femto cell.

Each base station may transmit the calculated strength of the biased received signal to the downlink base station through a backhaul network. The bias factor of the terminal with respect to the base station may be determined by applying a method predetermined by a system. An uplink bias factor of the base station may be determined mainly by the base station.

FIG. 1 is a diagram illustrating a configuration of a base station 100 according to an embodiment of the present invention.

The base station 100 may include a networking unit 110 and a processing unit 120.

The networking unit 110 may transmit data or information to a terminal or other base stations, and receive data or information from the terminal or the other base stations.

The processing unit 120 may generate data or information and transmit the generated data or information to the terminal or the other base stations through the networking unit 110, and process data or information transmitted from the terminal or the other base stations through the networking unit 110.

The processing unit 120 may include an uplink received signal strength measurer 121, a bias factor measurer 122, and an uplink biased received signal strength calculator 123.

The uplink received signal strength measurer 121 may measure a strength of an uplink received signal.

The bias factor measurer 122 may determine a bias factor of an uplink.

The uplink biased received signal strength calculator 123 may calculate a strength of a biased received signal based on the strength of the uplink received signal and the bias factor.

Figure 2:
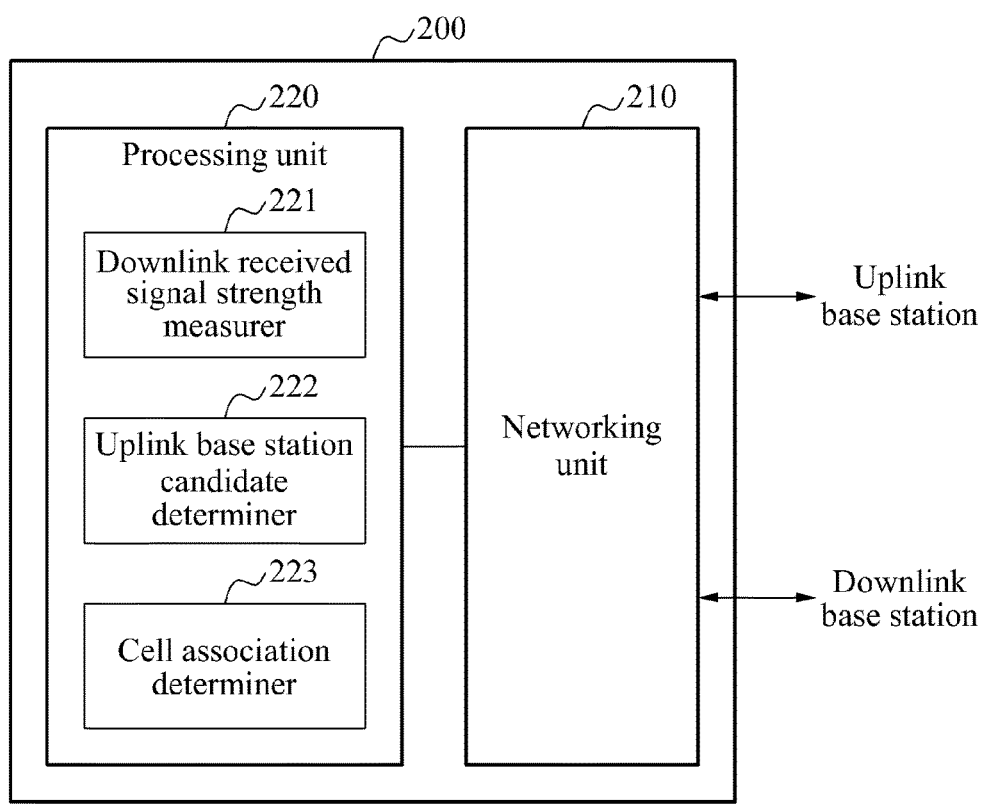
FIG. 2 is a diagram illustrating a configuration of a terminal according to an embodiment of the present invention.

FIG. 2 is a diagram illustrating a configuration of a terminal 200 according to an embodiment of the present invention.

The terminal 200 may include a networking unit 210 and a processing unit 220.

The networking unit 210 may transmit data or information to a terminal or other base stations, and receive data or information from the terminal or the other base stations. The networking unit 210 may set an uplink with an uplink base station. The networking unit 210 may set a downlink with a downlink base station.

The uplink base station may refer to a base station providing an uplink to the terminal 200. The downlink base station may refer to a base station providing a downlink to the terminal 200. The uplink may refer to a link through which data is transmitted from the terminal 200 to a network. The downlink may refer to a link through which data is transmitted from the network to the terminal 200.

The processing unit 220 may include a downlink received signal strength measurer 221, an uplink base station candidate determiner 222, and a cell association determiner 223.

The downlink received signal strength measurer 221 may measure a strength of a downlink received signal.

The uplink base station candidate determiner 222 may determine candidate base stations for the uplink base station based on the downlink received signal.

The cell association determiner 223 may determine an uplink cell association based on uplink cell association information received from the downlink base station. The downlink may be determined based on the downlink received signal.

Figure 3:
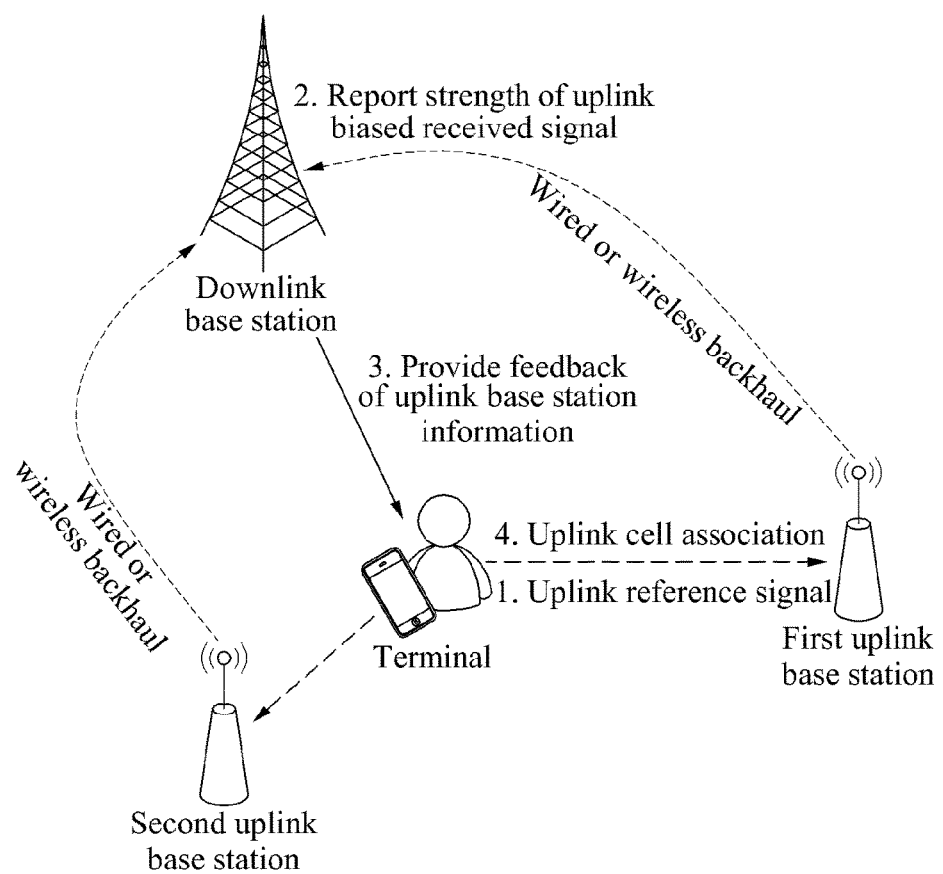
FIG. 3 illustrates a connection method of a terminal that separates an uplink according to an embodiment of the present invention.

FIG. 3 illustrates a connection method of a terminal that separates an uplink according to an embodiment of the present invention.

Referring to FIG. 3, base stations in a network may be candidate base stations for an uplink base station. A first uplink base station and a second uplink base station are illustrated as the candidate base stations for the uplink base station. A downlink base station may also be included in the candidate base stations. The candidate base stations may be called an uplink base station candidate group.

The terminal may transmit an uplink reference signal to the uplink base station candidate group in the network using a random access. The terminal may determine the uplink base station candidate group based on a strength of a downlink reference signal.

The uplink reference signal may include an identifier (ID) of the downlink base station and a reference signal flag variable. The reference signal flag variable may indicate a purpose of the uplink reference signal. The reference signal flag variable may indicate whether the uplink reference signal is a signal for measuring the uplink reference signal or a signal for the uplink cell association. Thus, a base station receiving the uplink reference signal may perceive a downlink base station to which the terminal is connected based on the identifier of the downlink base station. Also, the base station receiving the uplink reference signal may identify whether the uplink reference signal is the signal for measuring the uplink reference signal or the signal for the uplink cell association based on the reference signal flag variable.

Each base station in the uplink base station candidate group may measure a strength of an uplink received signal based on the uplink reference signal.

Each base station in the uplink base station candidate group may transmit the measured strength of the uplink received signal, a bias factor, and the identifier of the base station to the downlink base station through a backhaul network. Each base station in the uplink base station candidate group may report a strength of an uplink biased received signal to the downlink base station.

The downlink base station may feed uplink base station information back to the terminal through the established downlink.

The terminal may establish an uplink cell association with one base station in the uplink base station candidate group based on the uplink base station information. The base station with which the uplink cell association is established may become the uplink base station.

The backhaul network may refer to a wired or wireless backhaul.

Figure 4:
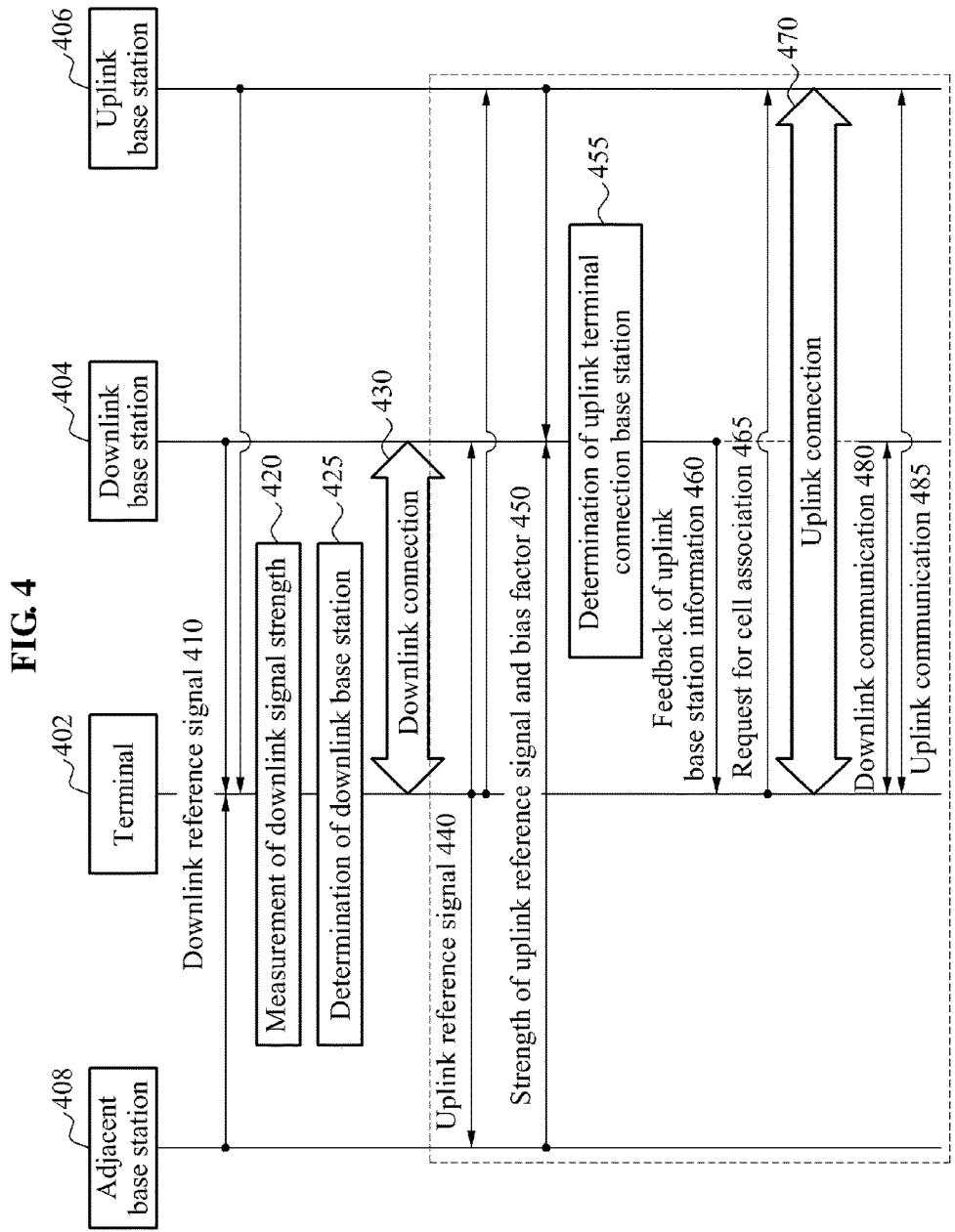
FIG. 4 illustrates signal flow in an operating method of a network according to an embodiment of the present invention.

FIG. 4 illustrates signal flow in an operating method of a network according to an embodiment of the present invention.

FIG. 4 illustrates an operating method of a terminal 402, a downlink base station 404, an uplink base station 406, and an adjacent base station 408.

The downlink base station 404, the uplink base station 406, and the adjacent base station 408 may be a plurality of base stations in a network. The downlink base station 404 may be a base station connected to the terminal 402 through a downlink. The adjacent base station 408 and the uplink base station 406 may be base stations in an uplink base station candidate group. The uplink base station 406 may be a base station connected to the terminal 402 through an uplink among base stations in the uplink base station candidate group. The adjacent base station 408 may refer to remaining base stations that may not be connected to the terminal 402 through the uplink among the base stations in the uplink base station candidate group.

Each of the downlink base station 404, the uplink base station 406, and the adjacent base station 408 may correspond to the base station 100 of FIG. 1. The terminal 402 may correspond to the terminal 200 of FIG. 2.

In operation 410, each of the base stations in the network may transmit a downlink reference signal to the terminal 402. The base stations may include the downlink base station 404, the uplink base station 406, and the adjacent base station 408. Each of the base stations in the network may broadcast the downlink reference signal.

The terminal 402 may receive the downlink reference signal from each of the base stations. Here, a plurality of the downlink reference signal may be provided. The terminal 402 may receive the downlink reference signal broadcasted by each of the base stations.

The terminal 402 may include a base station transmitting the downlink reference signal in the uplink base station candidate group.

In operation 420, the terminal 402 may measure a strength of the received downlink reference signal. The terminal 402 may measure the strength of the signal received from each of the base stations based on the received downlink reference signal.

In operation 425, the terminal 402 may determine the downlink base station 404 from among the base stations based on the received downlink reference signal. A base station determined first from among the base stations may be called a first base station.

The terminal 402 may determine the downlink base station 404 from among the base stations based on the measured strength of the downlink reference signal. The terminal 402 may determine, as the downlink base station 404, a base station transmitting the downlink reference signal having a greatest strength among downlink reference signals transmitted from the base stations.

In operation 430, a downlink connection between the terminal 402 and the downlink base station 404 may occur. The downlink connection may indicate a downlink cell association.

The terminal 402 may establish the downlink cell association with the downlink base station 404. Also, the downlink base station 404 may establish the downlink cell association with the terminal 402.

In operation 440, the terminal 402 may transmit the uplink reference signal to the base stations. The terminal 402 may transmit the uplink reference signal to the base stations using a random access. The base stations may refer to base stations in the uplink base station candidate group obtained based on the downlink reference signal received by the terminal 402 in operation 410.

In subsequent operations, one of the base stations may be selected as the uplink base station 406 by the downlink base station 404. The base station selected by the downlink base station 406 may be called a second base station. The uplink base station 406 may be the base station selected, by the downlink base station 404, from among the base stations to which the uplink reference signal is transmitted.

The uplink reference signal may include an identifier of the downlink base station 404 and an identifier of the terminal 402. The uplink reference signal may include a reference signal flag variable. The reference signal flag variable may indicate that the uplink reference signal to be transmitted may be a signal for measuring the uplink reference signal. Here, the measuring of the uplink reference signal may indicate measuring a strength of the uplink reference signal.

The identifier of the downlink base station 404 and the reference signal flag variable that may be added to the uplink reference signal may include a plurality of bits. The plurality of the bits may be accepted by a conventional network system or a protocol. For example, the uplink reference signal may be transmitted through a layer 2/layer 3 message used for the random access in 3rd generation partnership project (3GPP) long term evolution-advanced (LTE-A). Information about the message may be transmitted through a physical uplink shared channel (PUSCH). Thus, the uplink reference signal may be transmitted through the PUSCH.

Each base station receiving the uplink reference signal may measure the strength of the received uplink reference signal.

In operation 450, each of the base stations receiving the uplink reference signal may transmit the strength of the received uplink reference signal and a bias factor to the downlink base station 404. The downlink base station 404 may receive the strength of the uplink reference signal and the bias factor transmitted from each of the base stations.

A detailed description of a method of determining the bias factor will be provided hereinafter.

The base stations may identify the downlink base station 404 in the network by referring to the identifier of the downlink base station 404 in the uplink reference signal.

The strength of the uplink reference signal and the bias factor may be transmitted to the downlink base station 404 through the backhaul network between the downlink base station 404 and each of the base stations.

In operation 455, the downlink base station 404 may determine the uplink base station 406 from among the base stations based on the strength of the uplink reference signal transmitted from each of the base stations. The uplink base station 406 may be a base station to provide the uplink to the terminal 402.

The downlink base station 404 may identify a greatest value among strengths of uplink reference signals transmitted from the base stations and determine a base station transmitting the greatest value to be the uplink base station 406.

The downlink base station 404 may determine the uplink base station 406 based on the strength of the uplink reference signal and the bias factor transmitted from each of the base stations.

The downlink base station 404 may determine the uplink base station 406 among the base stations based on a strength of a biased received signal. The strength of the biased received signal may be a strength of a virtual received signal generated by applying the bias factor to an actual strength of the uplink reference signal. The downlink base station 404 may calculate strengths of biased received signals for each base station based on the strength of the uplink reference signal and the bias factor transmitted from each of the base stations. The downlink base station 404 may determine, as the uplink base station 406, a base station corresponding to the strength of the biased received signal having the greatest value among the calculated strengths of the biased received signals.

In operation 460, the downlink base station 404 may feed the uplink base station information back to the terminal 402. The uplink base station information may be the identifier of the uplink base station 406 providing the uplink to the terminal 402 among the base stations. The downlink base station 404 may transmit the identifier of the uplink base station 406 to the terminal 402, and the terminal 402 may receive the identifier of the uplink base station 406 from the downlink base station 404 through the downlink.

In operation 470, an uplink connection between the terminal 402 and the uplink base station 406 may occur. The uplink connection may indicate an uplink cell association.

The terminal 402 may establish the uplink cell association with the uplink base station 406 based on identifier of the uplink base station 406. The terminal 402 may identify the uplink base station 406 from the base stations in the network based on the identifier of the uplink base station 406 and request the uplink cell association from the identified uplink base station 406.

In operations 480 and 485, the terminal 402 may communicate using the established uplink and the downlink.

In operation 480, the terminal 402 may perform downlink communication with the downlink base station 404. The terminal 402 may receive data from the network through the downlink with the downlink base station 404.

In operation 485, the terminal 402 may perform uplink communication with the uplink base station 406. The terminal 402 may transmit data to the network through the uplink with the uplink base station 406.

The terminal 402 may communicate with an optimal base station for each of the uplink and the downlink through the foregoing separated connections.

Information needed to establish the uplink cell association is provided in Table 1.

TABLE 1

| Information | Description of Information |
|---|---|
| Uplink base station candidate group | A list of candidate base stations for an uplink base station to be determined based on a downlink reference signal received by a terminal. |
| Identifier (ID) of downlink base station | An ID of a downlink base station to which a terminal is connected. The connection may be a cell association. |
| Reference signal flag variable | A flag variable indicating a purpose of an uplink reference signal.<br>The variable is transmitted to candidate base stations in an uplink base station candidate group through a random access.<br>For example, when a value of the variable "ReferenceFlag" is "1," an uplink reference signal may be for measuring the uplink reference signal. When a value of the ReferenceFlag is "0," the uplink reference signal may be for an uplink connection. |
| ID of terminal | A unique ID of a terminal, or a temporary ID assigned by a base station. |
| Strength of uplink received signal | A strength of an uplink reference signal measured by a base station. |
| Bias factor | A value of a bias factor determined by a base station. |
| ID of uplink base station | An ID of an uplink base station determined by a downlink base station based on a strength of an uplink received signal and a bias factor. |

In Table 1, the identifier of the downlink base station, the identifier of the terminal, the strength of the uplink received signal, and the identifier of the uplink base station may be information used in a conventional network system or a conventional protocol.

The operations described with reference to FIG. 4 may be performed by the base station 100 of FIG. 1 and the terminal 200 of FIG. 2.

For example, a networking unit 210 of the terminal 200 may receive the downlink reference signal from each of the base stations in the network. A processing unit 220 of the terminal 200 may measure the strength of the downlink reference signal and select the downlink base station 404 from among the base stations in the network based on the measured strength.

The processing unit 220 may establish the downlink cell association with the downlink base station 404 through the networking unit 210. The networking unit 210 may receive the identifier of the uplink base station 406 providing the uplink from the downlink base station 404 to the terminal 200 through the downlink. Also, the processing unit 220 may establish the uplink cell association with the uplink base station 406 based on the identifier of the uplink base station 406 through the networking unit 210.

The networking unit 210 may transmit the uplink reference signal to the base stations in the network.

The processing unit 220 may communicate using the uplink and the downlink through the networking unit 210.

A processing unit 120 of the base station 100 may establish the downlink cell association with the terminal 200 through a networking unit 110 of the base station 100. The networking unit 110 may receive a strength of the uplink reference signal from each of the base stations in the network.

The processing unit 120 may determine the uplink base station 406 providing the uplink to the terminal 200 based on the strength of the uplink reference signal. The networking unit 110 may transmit the identifier of the determined uplink base station 406 to the terminal 200.

The processing unit 120 may determine the uplink base station 406 based on the strength of the uplink reference signal and the bias factor transmitted from each of the base stations in the network.

Figure 5:
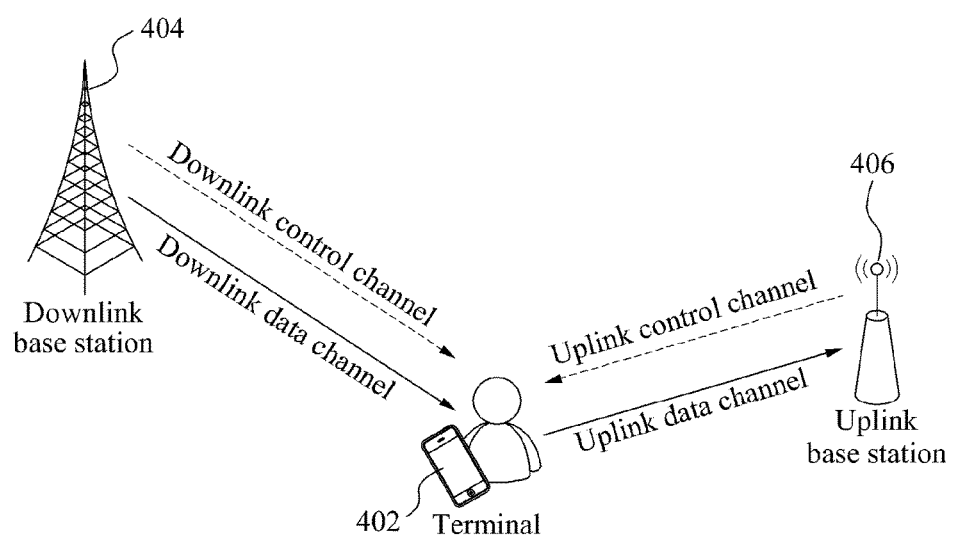
FIG. 5 illustrates a communication method according to an embodiment of the present invention.

FIG. 5 illustrates a communication method according to an embodiment of the present invention.

When the terminal 402 connects to the downlink base station 404 and the uplink base station 406 by separating a downlink and an uplink, the terminal 402 may perform data communication with an optimal base station for each of the downlink and the uplink through a separate cell association.

A downlink control channel and a downlink data channel may be established between the terminal 402 and the downlink base station 404. Similarly, an uplink control channel and an uplink data channel may be established between the terminal 402 and the uplink base station 406.

The terminal 402 may receive downlink control information for the downlink through the downlink control channel of the downlink base station 404.

The terminal 402 may receive uplink control information for the uplink through the downlink control channel or the uplink control channel of the uplink base station 406. Control information for a conventional network system or a conventional protocol may be used as the control information for the base station. In a case of 3GPP LTE-A, the terminal 402 may receive the uplink control information using a control channel of a physical downlink control channel (PDCCH) or a physical layer downlink shared channel (PDSCH).

A detailed description of a method of determining a bias factor of an uplink will be provided hereinafter.

The base station 100 of FIG. 1 may determine, as a value of the bias factor, a value that may maximize a metric to be suitable for a network system. The base station 100 may determine the bias factor or the value of the bias factor using a predetermined method.

The bias factor may be used to set the uplink. Thus, the bias factor may be an uplink bias factor. Each base station in an uplink base station candidate group may determine or calculate respective bias factors.

The bias factor may be determined based on a performance metric. The performance metric may include an average transmission rate of the base station 100 and an average transmission rate of the terminal 200 of FIG. 2. The bias factor may be determined based on at least one of an average transmission rate of the uplink base station 406 and an average transmission rate of the terminal 402.

The bias factor may be determined based on Equation 1.

$$\eta_j^* = \arg\max_\eta F_j(\eta_j) \qquad \text{[Equation 1]}$$

In Equation 1, "$F_j$" may denote a performance metric of a $j^{th}$ base station among base stations in a network. Also, $F_j$ may be the performance metric with respect to an uplink of the $j^{th}$ base station.

For example, $F_j$ may denote a function indicating a purpose of the $j^{th}$ base station or a purpose of a network system. The purpose may be to maximize a data transmission quantity of the $j^{th}$ base station or to maximize an overall data transmission quantity of the network system.

$\eta$ may denote a set of uplink candidate values $\eta^*_j$ may denote a determined uplink. Also, $\eta^*_j$ may be a value that maximizes a resulting value of $F_j$ among the values in $\eta$. The bias factor may be an input value that may maximize a result value obtained based on a performance metric, among input values given to a base station.

A value that may maximize a value of a given performance metric may be selected as an uplink value from among the uplink candidate values.

A strength of a biased received signal may be determined based on Equation 2.

$$\overline{P}_{j,n} = f(\eta^*_j P_{j,n}) \qquad \text{[Equation 2]}$$

In Equation 2, "$f$" may denote a function determining the strength of the biased received signal. $P_{j,n}$ may denote an actual strength of an uplink received signal for a $j^{th}$ base station and an $n^{th}$ terminal. An input value of the $f$ may be a bias factor and the actual strength of the uplink received signal. Alternatively, the input value of the $f$ may be a multiplication of the bias factor and the actual strength of the uplink received signal.

$\overline{P}_{j,n}$ may denote a calculated strength of the biased received signal for the $j^{th}$ base station and the $n^{th}$ terminal.

The bias factor may be used in accordance with a purpose of the network system. For example, as in Equation 2, the bias factor may be multiplied by the actual strength of the uplink received signal. Alternatively, the bias factor may divide the actual strength of the uplink received signal. A result obtained from the multiplying or the dividing may be used as the input value of $f$. The bias factor may be used to adjust the strength of the uplink received signal to appear to be greater or smaller.

Figure 6:
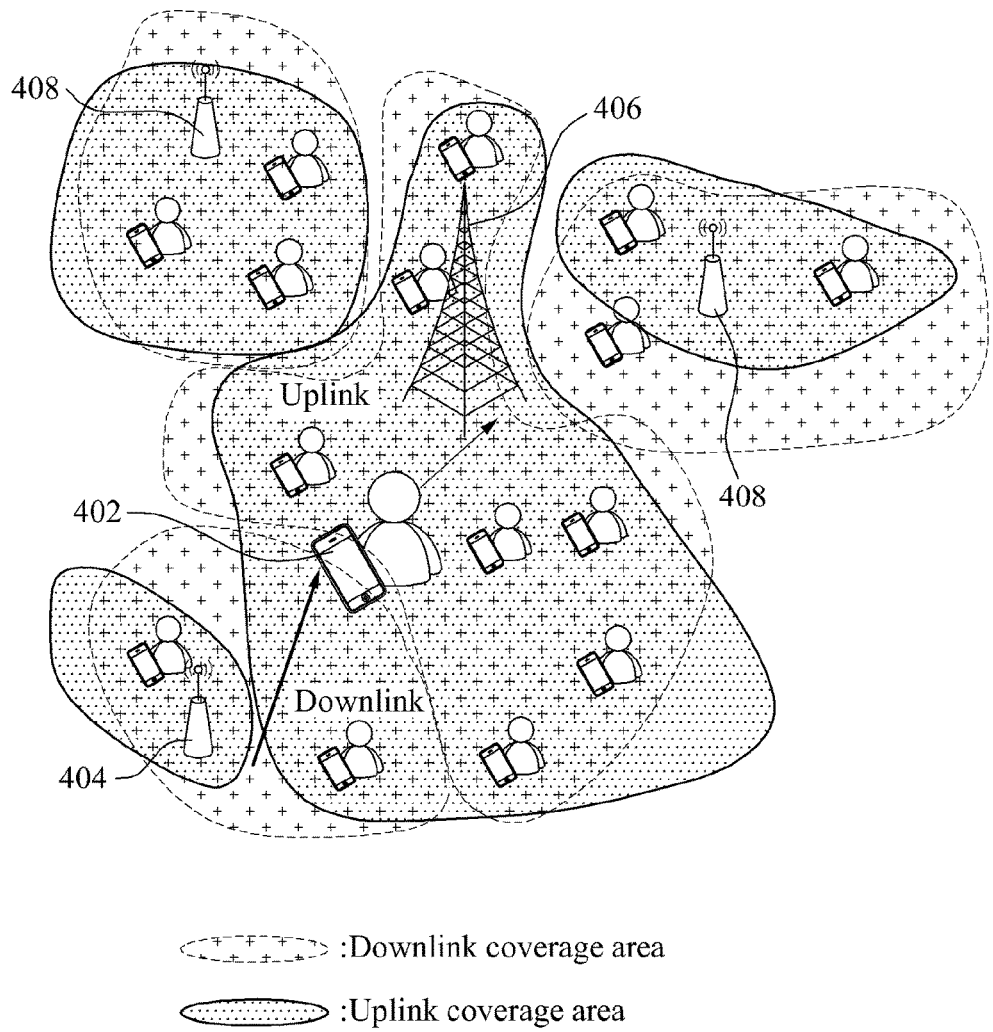
FIG. 6 illustrates a cell area according to an embodiment of the present invention.

FIG. 6 illustrates a cell area according to an embodiment of the present invention.

As described in the foregoing with reference to FIG. 5, control channels for data communication of each link may be completely separated with respect to a downlink and an uplink. Thus, a downlink and uplink separated terminal connection may be achieved.

When the downlink and uplink separated terminal connection is applied, a downlink coverage area may differ from an uplink coverage area illustrated in FIG. 6. Here, the uplink coverage area may be a biased uplink coverage area.

Figure 7:
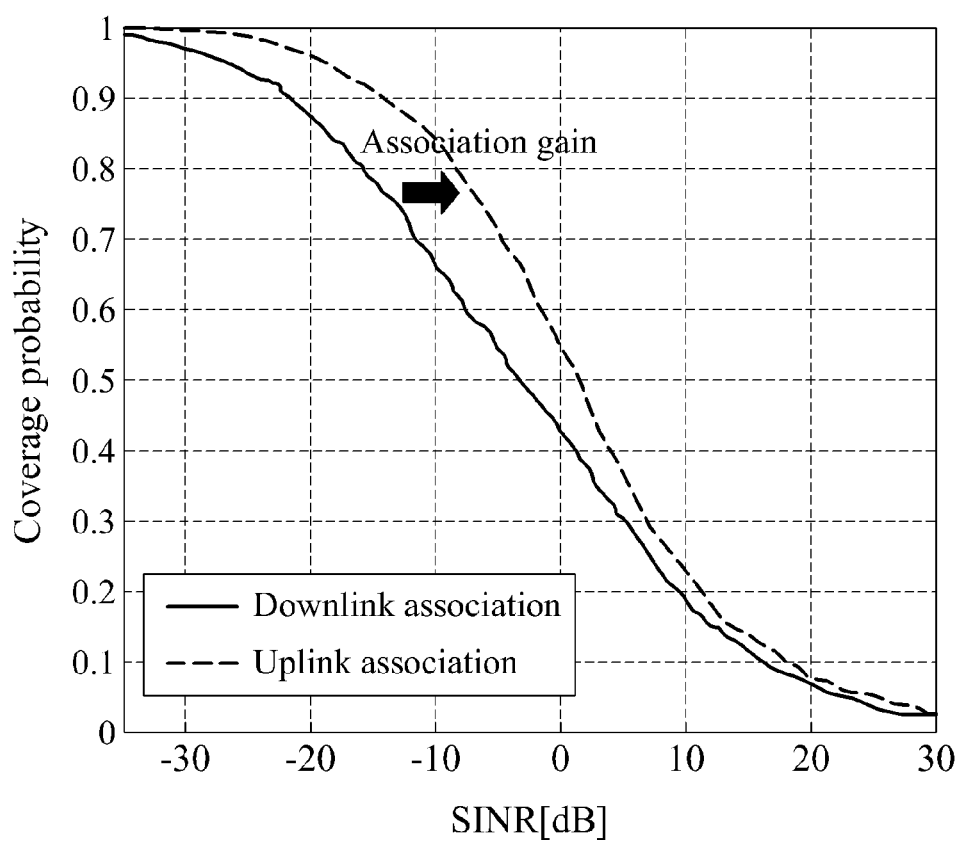
FIG. 7 is a graph illustrating a coverage probability of an uplink in a case of a divided terminal connection according to an embodiment of the present invention.

FIG. 7 is a graph illustrating a coverage probability of an uplink in a case of a divided terminal connection according to an embodiment of the present invention.

Embodiments described herein may enable a separate uplink cell association without numerous modifications to a conventional network system or a conventional protocol. The embodiments may provide a method for an uplink cell association without a modification to a downlink cell association and thus, backward compatibility may be maintained. Accordingly, the embodiments may be applicable to various standards for a cellular network that is currently used for a commercial purpose. The standards may include a wideband code division multiple access (WCDMA), 3GPP LTE, and LTE-A.

Also, a downlink and an uplink terminal connection may separately occur and thus, a loss in a signal to interference-noise ratio (SINR) may not be incurred in comparison to a terminal connection based solely on a situation of a single link, and a data transmission rate may be improved.

Further, a terminal connection based on a bias factor to which a current situation of a base station is applied may occur with respect to an uplink and thus, an issue of load balancing among base stations may be separately solved with respect to a downlink.

Furthermore, due to a bias factor determined based on a purpose of a network system, a cell association of a terminal may be managed in accordance with the purpose of the system.

The graph of FIG. 7 may indicate the coverage probability of the uplink when the separated terminal connection is used. The coverage probability may denote a probability of an SINR of the terminal being greater than a predetermined SINR limit T, which may be represented by "SINR>T." As illustrated in FIG. 7, when the cell association based on the uplink is performed, the coverage probability of the uplink may be improved.

According to an embodiment of the present invention, there is provided a method and an apparatus that may perform a separate connection with respect to a downlink and an uplink.

According to another embodiment of the present invention, there is provided a method and an apparatus that may determine an uplink base station based on a strength of a received signal and a bias factor.

The units described herein may be implemented using hardware components and software components. For example, the hardware components may include microphones, amplifiers, band-pass filters, audio to digital convertors, and processing devices. A processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums. The non-transitory computer readable recording medium may include any data storage device that can store data which can be thereafter read by a computer system or processing device.

The above-described exemplary embodiments of the present invention may be recorded in non-transitory computer-readable media including program instructions to implement various operations embodied by a computer. The media may also include, alone or in combination with the program instructions, data files, data structures, and the like. Examples of non-transitory computer-readable media include magnetic media such as hard disks, floppy discs, and magnetic tape; optical media such as CD ROM discs and DVDs; magneto-optical media such as floptical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present invention, or vice versa.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. An operating method of a network comprising at least a base station, the method comprising:
    transmitting, performed by each of base stations, a downlink reference signal to a terminal;
    receiving, performed by a first base station, a strength of the downlink reference signal from the terminal;
    establishing, performed by the first base station, a downlink cell association with the terminal;
    determining, performed by the first base station, an identifier of a second base station providing an uplink control channel;
    transmitting, performed by the first base station, the identifier of a second base station through the downlink cell association; and
    establishing, performed by the second base station, an uplink cell association with the terminal.

2. The method of claim 1, wherein the strength of the downlink reference signal is measured by the terminal.

3. The method of claim 1, wherein a base station candidate group is updated by the terminal based on the strength of the downlink reference signal.

4. The method of claim 1, further comprising:
    receiving, performed by the second base station, an uplink reference signal.

5. The method of claim 1, wherein the first base station is a macro base station and the second base station is a small base station.

6. A base station, comprising:
    a networking unit configured to transmit a downlink reference signal to a terminal; and
    a processor configured to establish a downlink cell association with the terminal,
    wherein the processor further configured to determine an identifier of a second base station providing an uplink control channel, and
    wherein the networking unit further configured to receive a strength of the downlink reference signal from the terminal, and to transmit the identifier of the second base station through the downlink cell association.

7. The base station of claim 6, wherein the base station is a macro base station and the second base station is a small base station.

8. An operating method of a terminal performed by the terminal, the method comprising:
    receiving a downlink reference signal from each of base stations;
    measuring a strength of the downlink reference signal;
    updating a base station candidate group by adding at least one base station among the base stations to the base station candidate group;
    establishing a downlink cell association with a first base station;
    receiving an identifier of a second base station providing an uplink control channel from the first base station through the downlink cell association, wherein the second base station is selected by the first base station; and
    establishing an uplink cell association with the second base station based on the identifier of the second base station.

* * * * *